US008688672B2

(12) United States Patent
Ueno et al.

(10) Patent No.: US 8,688,672 B2
(45) Date of Patent: Apr. 1, 2014

(54) SEARCH APPARATUS AND METHOD, AND PROGRAM

(75) Inventors: Ichiro Ueno, Saitama (JP); Baiping Liao, Saitama (JP); Hiroyuki Tominaga, Kanagawa (JP)

(73) Assignee: Sony Corporation (JP)

( * ) Notice: Subject to any disclaimer, the term of this patent is extended or adjusted under 35 U.S.C. 154(b) by 249 days.

(21) Appl. No.: 11/705,799

(22) Filed: Feb. 13, 2007

(65) Prior Publication Data

US 2007/0203897 A1     Aug. 30, 2007

(30) Foreign Application Priority Data

Feb. 14, 2006   (JP) ................................ P2006-036499

(51) Int. Cl.
*G06F 17/30*          (2006.01)

(52) U.S. Cl.
USPC ............ 707/706; 707/913; 707/915; 707/918

(58) Field of Classification Search
USPC ............... 707/1–5, 104.1, 706, 913, 915, 918
See application file for complete search history.

(56) References Cited

U.S. PATENT DOCUMENTS

| 6,263,343 | B1 * | 7/2001 | Hirono ........................... 707/770 |
| 6,629,104 | B1 * | 9/2003 | Parulski et al. ................ 382/307 |
| 6,882,350 | B2 * | 4/2005 | Asami ........................... 345/638 |
| 7,587,403 | B2 * | 9/2009 | Sohma et al. ......................... 1/1 |
| 7,707,140 | B2 * | 4/2010 | Leishman et al. ...... 707/999.003 |
| 7,797,642 | B1 * | 9/2010 | Karam et al. ................. 715/810 |
| 7,929,808 | B2 * | 4/2011 | Seaman et al. ................ 382/305 |
| 8,194,986 | B2 * | 6/2012 | Conwell ....................... 382/224 |
| 2003/0063321 | A1 |  4/2003 | Inoue et al. |
| 2004/0070678 | A1 * | 4/2004 | Toyama et al. ............. 348/231.3 |

(Continued)

FOREIGN PATENT DOCUMENTS

| GB | 2 376 297 | 12/2002 |
| JP | 2001133283 A | 5/2001 |

(Continued)

OTHER PUBLICATIONS

Eisler R et al: "Cooperative robotic map correlation from relative position and terrain slope measurements" World Automation Congress, 2002.Proceedings of the 5th Biannual Jun. 9-13, 2002, Piscataway, NJ, USA,IEEE, vol. 14, Jun. 9, 2002, pp. 329-334.

(Continued)

*Primary Examiner* — Thanh-Ha Dang
(74) *Attorney, Agent, or Firm* — Lerner, David, Littenberg, Krumholz & Mentlik, LLP

(57) ABSTRACT

A search apparatus may include the following elements. A provisional search condition inputting unit inputs character string information as a provisional search condition. A character string/position correspondence information holding unit holds character string/position correspondence information including a correspondence between character string information and position information. A position information obtaining unit obtains position information corresponding to the character string information input as the provisional search condition from the character string/position correspondence information. A search object information storage unit stores search object information with additional information including at least position information. A searching unit performs a search for the position information of the search object information stored in the search object information storage means using the position information obtained by the position information obtaining unit as an actual search condition, and outputs search object information having the found position information as a search result satisfying the provisional search condition.

13 Claims, 10 Drawing Sheets

(56) References Cited

U.S. PATENT DOCUMENTS

| | | | |
|---|---|---|---|
| 2004/0080510 A1* | 4/2004 | Inokuchi et al. | 345/440 |
| 2004/0128691 A1* | 7/2004 | Egawa et al. | 725/88 |
| 2004/0215660 A1* | 10/2004 | Ikeda | 707/104.1 |
| 2004/0230558 A1* | 11/2004 | Tokunaka | 707/1 |
| 2005/0151843 A1* | 7/2005 | Ozaki et al. | 348/143 |
| 2005/0228860 A1 | 10/2005 | Hamynen et al. | |
| 2006/0025071 A1* | 2/2006 | Yamazaki et al. | 455/3.06 |
| 2006/0044635 A1* | 3/2006 | Suzuki et al. | 358/527 |
| 2006/0080286 A1* | 4/2006 | Svendsen | 707/3 |
| 2006/0105781 A1* | 5/2006 | Ueda et al. | 455/456.1 |
| 2006/0173913 A1* | 8/2006 | Aoyama | 707/104.1 |
| 2006/0294476 A1* | 12/2006 | Buckley | 715/781 |
| 2007/0198951 A1* | 8/2007 | Frank | 715/838 |
| 2010/0278439 A1* | 11/2010 | Lennington et al. | 382/209 |
| 2011/0161861 A1* | 6/2011 | Abramson et al. | 715/781 |

FOREIGN PATENT DOCUMENTS

| | | | |
|---|---|---|---|
| JP | 2001282813 A | 10/2001 | |
| JP | 2002108885 A | 4/2002 | |
| JP | 2002350151 A | 12/2002 | |
| JP | 2003076696 A | 3/2003 | |
| JP | 2003099451 A | 4/2003 | |
| JP | 2003209779 A | 7/2003 | |
| JP | 2004-233150 A | 8/2004 | |

OTHER PUBLICATIONS

Nakagawa T et al: "Self-organizing feature map with position information and spatial frequency information" Neural Networks for Processing 1993 III.Proceedings of the 1993 IEEE—SP Workshop Linthicum Heights, MD, USA Sep. 6-9, 1993, New York, NY, USA,IEEE, Sep. 6, 1993, pp. 40-49.

Office Action from Japanese Application No. 2006-036499, dated Jul. 26, 2011.

Yoshinari Shirai, Information Retrieval Method based on Actual Image That Uses Situation of Real World, Journal of Human Interface Academy,Japan, Human Interface Academy, Nov. 25, 2000, vol. 2, No. 4, pp. 1 to 8.

Japanese document with Abstract only in English. Office Action from Japanese Application No. 2006-036499, dated Feb. 19, 2013.

* cited by examiner

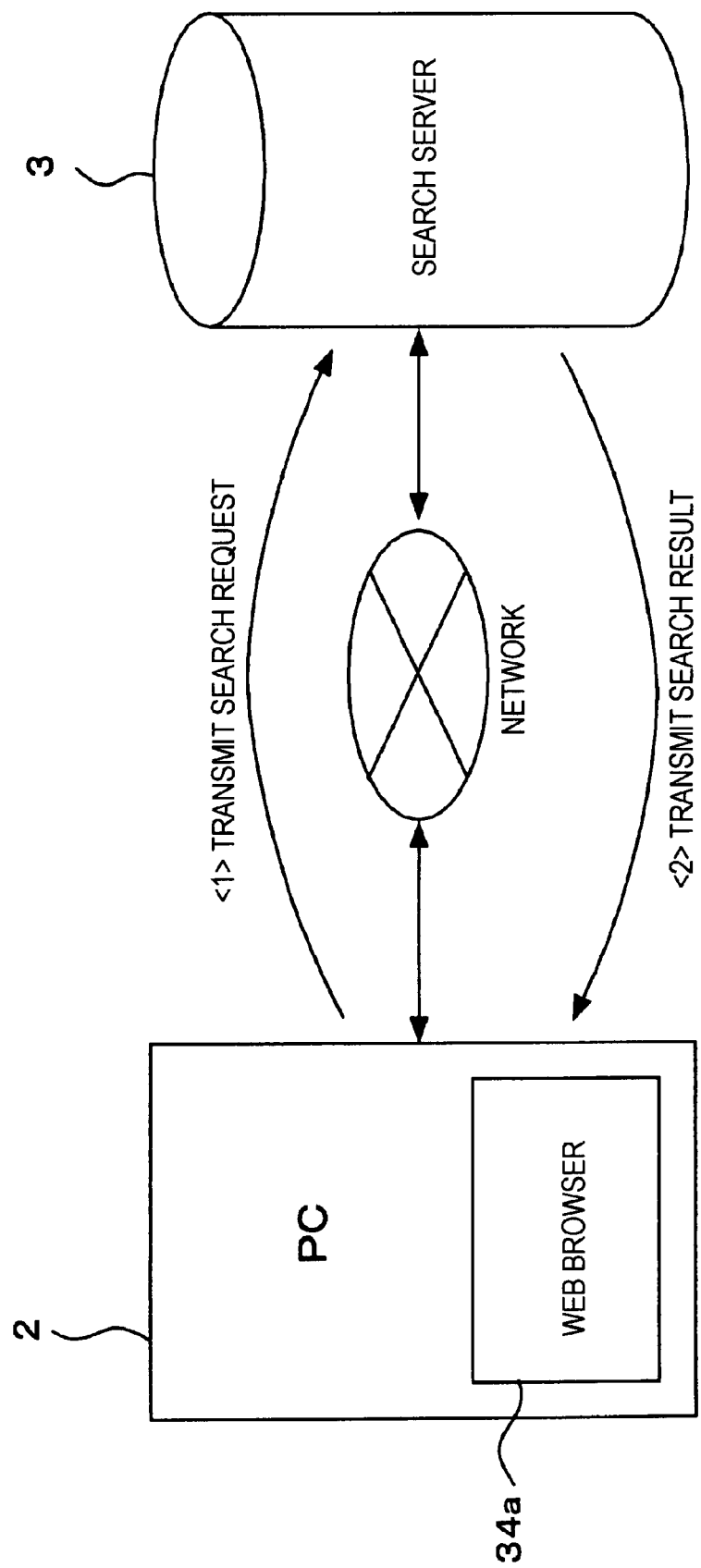

SEARCH IMAGE LIST VIEW

SEARCH AREA RANGE VIEW

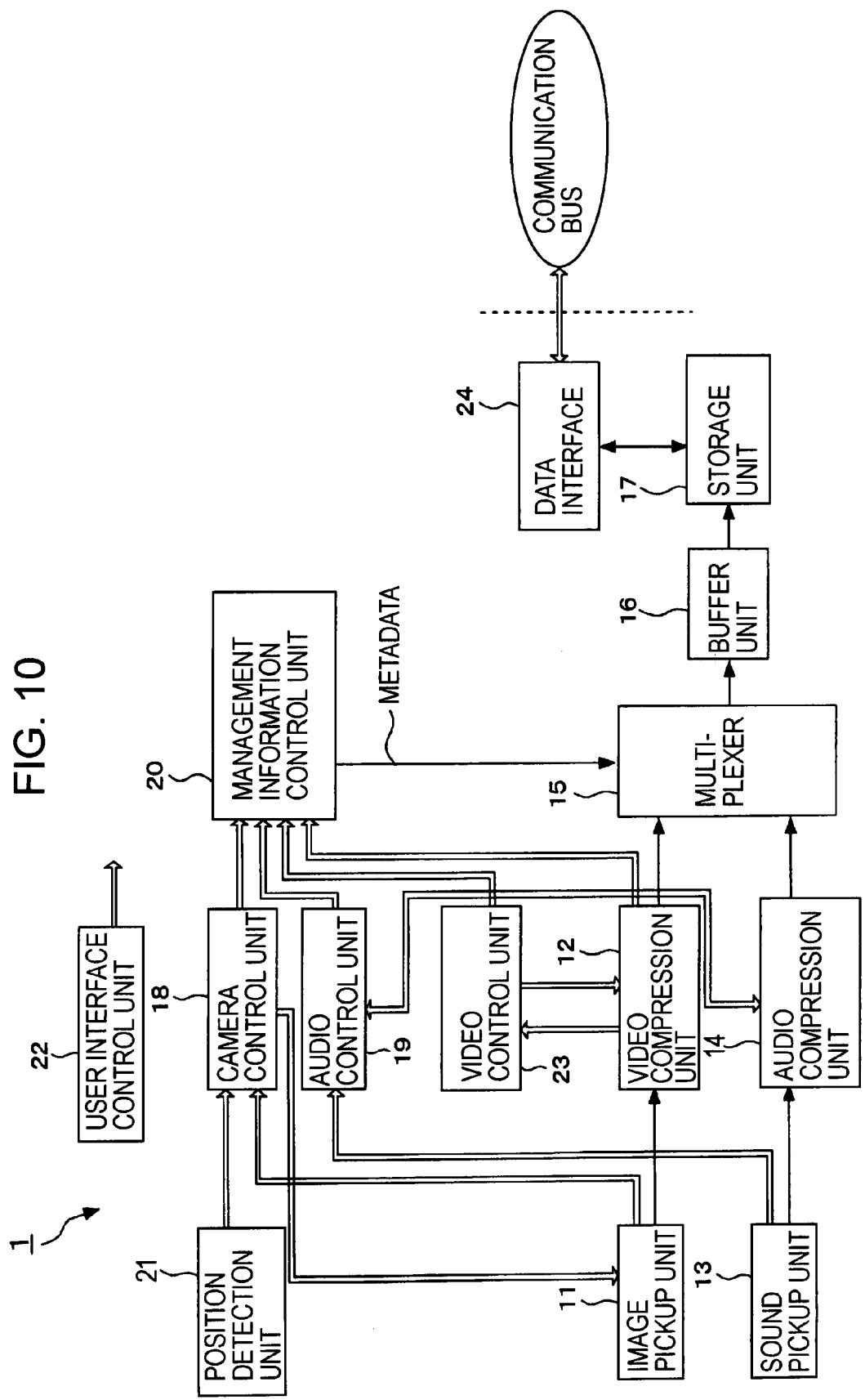

SEARCH APPARATUS AND METHOD, AND PROGRAM

CROSS-REFERENCE TO RELATED APPLICATIONS

The present application claims priority from Japanese Patent Application JP 2006-036499 filed in the Japanese Patent Office on Feb. 14, 2006, the entire content of which is incorporated herein by reference.

BACKGROUND OF THE INVENTION

1. Field of the Invention

The present invention relates to a search apparatus for searching a predetermined type of data such as image data as search objects and to a method for the search apparatus. The present invention further relates to a program executed by the search apparatus.

2. Description of the Related Art

With the use of a device having a global positioning system (GPS) function in combination of an image capturing apparatus such as a video camera or a digital still camera, position information associated with the capture time can be added as additional information to files of image data (image files) based on moving images or still images recorded by the image capturing apparatus.

The image files with position information can be used for various software applications such as map applications. Once an image file with position information is read into a map software application, the map software application displays the image of the read image file and the position at which the image file was captured (recorded) using a map image. Such a technique is disclosed in Japanese Unexamined Patent Application Publication No. 2004-233150.

SUMMARY OF THE INVENTION

Accordingly, adding position information to image data facilitates the use in association with a map image, and therefore enhances the usability. In the current situation, however, such position information added to image data can merely be used by map applications. It is therefore desirable to more effectively use image data having position information.

A search apparatus according to an embodiment of the present invention may include the following elements. Provisional search condition inputting means inputs character string information as a provisional search condition. Character string/position correspondence information holding means holds character string/position correspondence information including a correspondence between character string information and position information. Position information obtaining means obtains position information corresponding to the character string information input as the provisional search condition from the character string/position correspondence information. Search object information storage means stores search object information of predetermined form having at least position information added thereto as additional information. Searching means performs a search for the position information added to the search object information stored in the search object information storage means using the position information obtained by the position information obtaining means as an actual search condition, and outputs, as a search result satisfying the provisional search condition, search object information to which position information found by the search is added.

With the above-described structure, information of predetermined form to be searched (search object information) according to an embodiment of the present invention may have a structure in which position information is added. In the search apparatus according to the embodiment of the present invention, when character string information is input as a provisional search condition, first, position information having a correspondence with the character string information may be specified by referring to character string/position correspondence information, and a search is performed for position information added as additional information to the search object information using the specified position information as an actual search condition. Search object information associated with the found position information is output as a search result meeting the provisional search condition input to the search apparatus.

In the embodiment of the present invention, therefore, a novel search system can be achieved in which when a search is performed using a character string, information or data of predetermined form associated with, for example, an area or a place defined by the character string may be obtained as a search result. Further, as described above, the search apparatus according to the embodiment of the present invention may be based on the premise that search object information has position information added thereto, which leads to more effective use of data having a structure including position information as additional information, such as image data.

BRIEF DESCRIPTION OF THE DRAWINGS

FIG. 1 is a diagram showing an example network configuration including a search server according to an embodiment of the present invention and a personal computer (PC) using the search server;

FIG. 10 is a diagram showing an example structure of an image capturing apparatus shown in FIG. 9.

DESCRIPTION OF THE PREFERRED EMBODIMENTS

Figure 2B:
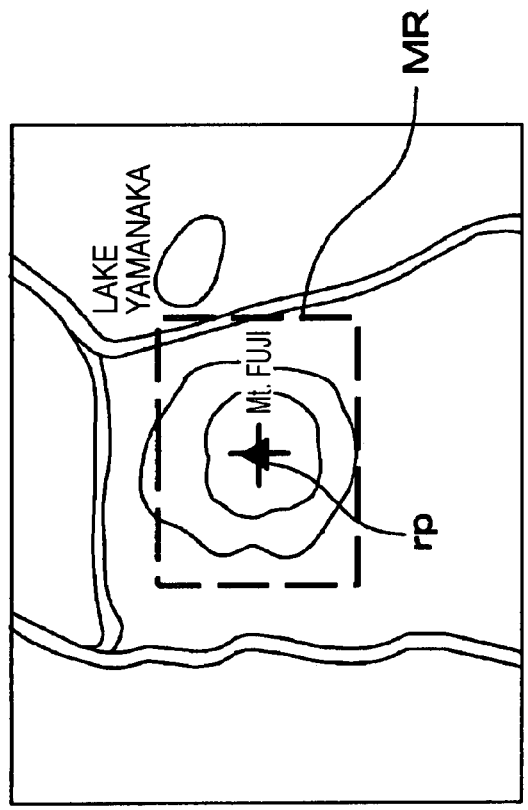
FIGS. 2A and 2B are diagrams showing examples of search screens according to the embodiment displayed in a Web browser.

An embodiment of the present invention will be described. In the embodiment, for example, a search server located on a network such as the Internet has the structure of a search apparatus according to an embodiment of the present invention.

FIG. 1 shows a simplified system configuration including a search-server 3 according to the embodiment, and a personal computer (PC) 2 serving as a network terminal that uses the search server 3. First, the overview of a search method using the search server 3 of the embodiment will be described with reference to FIG. 1.

For example, when the user of the PC 2 desires to perform a search using the search server 3, the user activates a Web browser 34a on the PC 2. The Web browser 34a is a software application operable to access a piece of Web content (Web page) publicly available on the Internet for browsing. The user operates the activated Web browser 34a to access the search server 3 via a network to issue a request for a search screen. In response to the request, the search server 3 transmits data of the Web page as a user interface screen for search. The PC 2 interprets the received Web page data, and displays a search screen using the Web browser 34a. As is well known in the art, a Web page is described using a markup language such as Hyper Text Markup Language (HTML) or Extensible Markup Language (XML), and a Web browser is configured to interpret the description for reproduction.

The search screen displayed using the Web browser 34a includes an entry box for entering a search condition in form of a character string. The user enters any character string in the entry box before performing an operation such as a button operation for issuing a search request. In accordance with the operation, the Web browser 34a of the PC 2 performs communication via a network to issue a search request to the search server 3 using the data of the character string entered in the entry box as a search condition.

In response to the search request, the search server 3 performs a search using the character string transmitted as a search condition together with the request. The search server 3 returns the contents of a search result obtained by the search to the PC 2 as data in the form that can be displayed as a Web page.

The PC 2 displays and outputs the contents of the transmitted search result using the Web browser 34a.

As can be understood from the foregoing description, in order to use the search server 3 of the embodiment, as in the case of using a search site on the Internet, which is well known, the user can only operate a Web browser application using a terminal such as a personal computer without using a special apparatus or performing any complicated operation.

Examples of a search service provided by the search server 3 of the embodiment will be described with reference to FIGS. 2A to 3B. FIGS. 2A to 3B show examples of the display style of the search screen displayed on a display of the PC 2 during the access from the PC 2 to the search server 3 to use the search service.

As described above with reference to FIG. 1, first, the user of the PC 2 who desires to use the search service of the search server 3 activates a Web browser on the PC 2, and accesses the search server 3 using the Web browser. Then, a search screen having an entry box for entering a search condition is displayed as the initial screen on the display of the PC 2.

In the embodiment, the search service of the search server 3 will be described in the context of an image search. For ease of description, images to be searched are photograph images (data files of the photograph images).

It is assumed that the user desires to search for a photograph image relating to Mt. Fuji. For example, the user performs a character input operation using a keyboard or the like to enter character string "Mt. Fuji" in the entry box of the search screen displayed on the Web browser, and performs an operation corresponding to a button click operation for performing a search. In accordance with the operation, the Web browser transmits a search request to the search server 3 in which the character string information "Mt. Fuji" is designated as a search condition.

In response to the search request, the search server 3 performs a search, and returns search results to the Web browser of the PC 2. The search results are displayed in the window of the Web browser, for example, in the manner shown in FIG. 2A. In FIG. 2A, photograph images as search results corresponding to the character string information of "Mt. Fuji" designated as a search condition are listed (hereinafter referred to as a "search image list view").

Figure 2A:
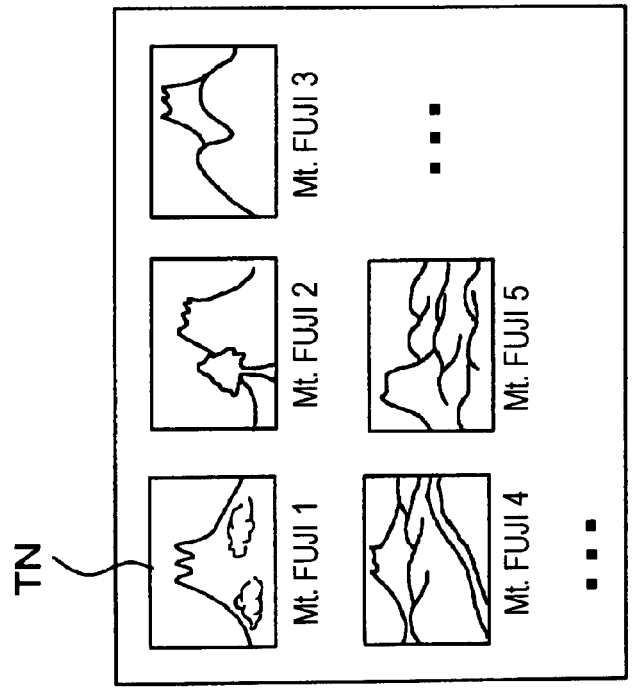

In the widow of the Web browser, a search area range view shown in FIG. 2B, as well as the list view of the images as search results shown in FIG. 2A, is displayed. In order to display the search area range view, first, a map image of an area having a certain range is displayed. A reference position rp is displayed at a given point in the map image, and a search range designation frame MR of a predetermined shape that is positioned with reference to the reference position rp is superimposed over the map image. The search range designation frame MR may be, for example, rectangular corresponding to the frame configuration of the search area range view.

The search area range view shown in FIG. 2B displays a map of an area around Mt. Fuji. The reference position rp is defined at the top of Mt. Fuji, and an area surrounded by a rectangle having a predetermined range about the reference position rp is designated as the search range designation frame MR. The displayed search range designation frame MR defines a range of the positions corresponding to the images listed in the search image list view shown in FIG. 2A. In other words, the photograph images listed in the search image list view shown in FIG. 2A were actually taken in the area defined by the search range designation frame MR. Therefore, the search image list view shown in FIG. 2A is a screen on which the main search results are output. In the search area range view shown in FIG. 2B, on the other hand, an area range (a range of position information) that is designated as a substantial search condition with respect to the search results output in the search image list view is visually displayed, and the search area range view therefore has an auxiliary function to the main search results.

The search range designation frame MR in the search area range view shown in FIG. 2B can be resized on the map image in accordance with an operation performed on the PC 2. For example, as in the operation for specifying a range using a software application such as an image processing application, the user may drag the mouse or the like to change the size of the search range designation frame MR while maintaining the ratio of the vertical and horizontal lengths of the search range designation frame MR. The ratio of the vertical and horizontal lengths of the search range designation frame MR may be changed. Further, the reference position rp and the position of the search range designation frame MR on the map image can also be moved.

Figure 3B:
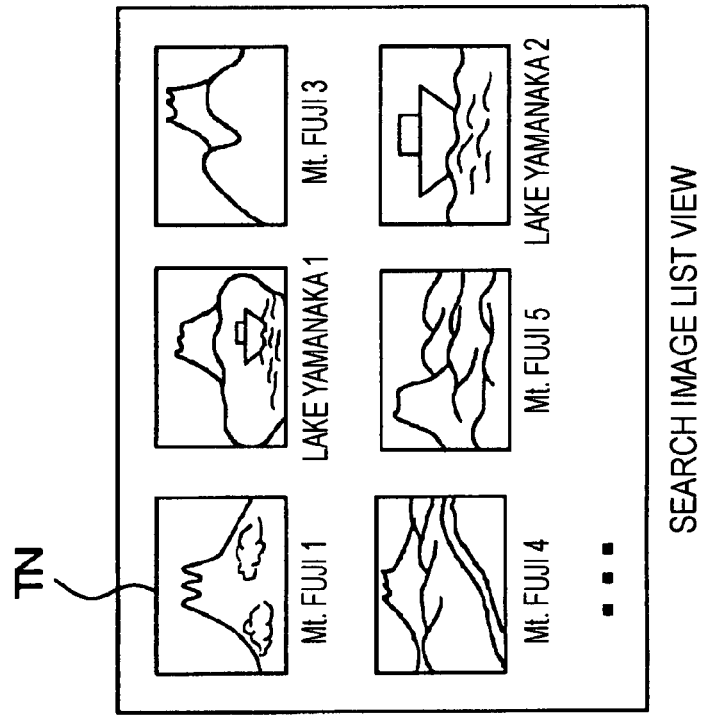
FIGS. 3A and 3B are diagrams showing examples of search screens according to the embodiment displayed in the Web browser.
Figure 3A:
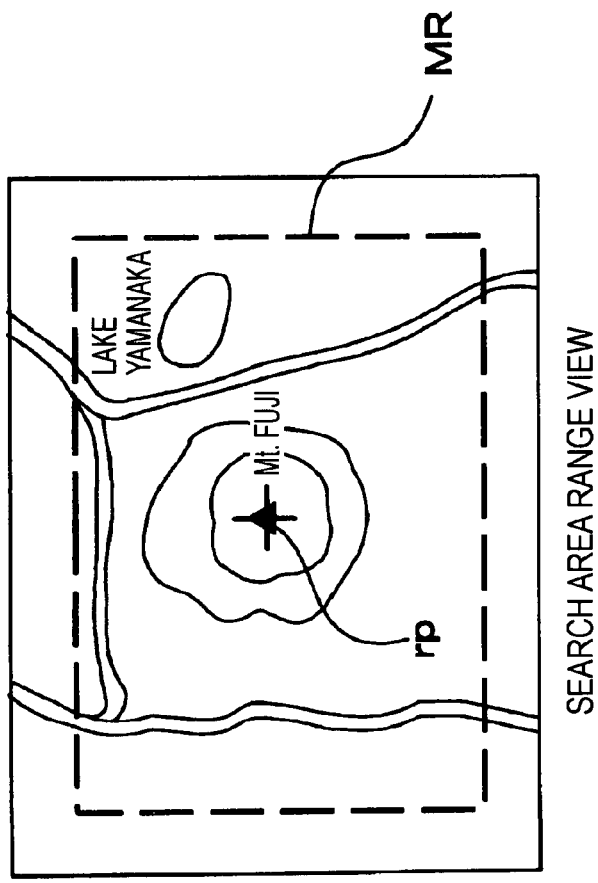

A specific example of the resizing of the search range designation frame MR shown in FIG. 2B will be described with reference to FIG. 3A. The user desires to resize the search range designation frame MR shown in FIG. 2B in the manner shown in FIG. 3A for the following reasons: First, the user enters "Mt. Fuji" as a search character string to search for an image of an area around Mt. Fuji, in which case the user actually desires an image of the area around Mt. Fuji, which also covers around Lake Yamanaka. However, the area range defined by the search range designation frame MR shown in FIG. 2B does not cover Lake Yamanaka. Thus, the size of the search range designation frame MR is increased to designate an area range covering Lake Yamanaka as well as Mt. Fuji, as shown in FIG. 3A.

In accordance with the resizing of the search range designation frame MR, the Web browser of the PC 2 issues another search request using information representing an area range on the map corresponding to the resized search range designation frame MR as a search condition to the search server 3. The search server 3 performs a search according to the search condition, and returns search results. Accordingly, the search image list view transitions from FIG. 2A to FIG. 3B, and photograph images taken in the area range defined by the resized search range designation frame MR are listed. That is, in the current search image list view, images taken around Lake Yamanaka are additionally displayed in addition to the images of Mt. Fuji.

Although not illustrated, the size of the search range designation frame MR may be reduced in a transition reverse to the transition from FIG. 2B to FIG. 3A to define a new area range.

As can be understood from the foregoing description, in the photograph image search of the embodiment, character string information is used as the initial search condition. In the related art, generally, a search character string used for searching for an image defines a file name of the image or a character string found in the text added to the layout of the image in a Web page or the like. In the embodiment, on the other hand, search character string information includes a designated place or area where the photograph image to be searched for was taken.

For example, as in the specific example described above, in a case where a user desires to search for a photograph image showing Mt. Fuji as a landscape, the photograph image of Mt. Fuji can be found even using the image search of the related art by entering character string "Mt. Fuji" as a search condition and performing a search. However, the image search of the related art is based on file names, text of Web pages, or the like, and it is therefore difficult to find an image as a search result if the image has a file name that does not contain "Mt. Fuji" or the text of the Web page does not include character string "Mt. Fuji". In the embodiment, a search character string defines the name of a location such as a place where a photograph image was taken, and an image taken at a place or an area specified as a search condition can be found regardless of the file name or the text of the Web page. Therefore, an image search in view of a place where the image was taken can provide more accurate search results than the image search of the related art.

In the embodiment, both the search image list view shown in FIG. 2A and the search area range view shown in FIG. 2B are displayed. Therefore, once a user observes the search range designation frame MR in the search area range view, the user can visually perceive the area range where the images displayed in the search image list view were actually taken. Further, the user can change the range of search conditions by performing a graphical operation for resizing the search range designation frame MR on the map image in the search area range view in the manner shown in FIGS. 2B and 3A. For example, in order to search for an image relating to "Mt. Fuji" and "Lake Yamanaka" using the search of the related art, both character strings "Mt. Fuji" and "Lake Yamanaka" are entered in the entry box, and an operation for performing an OR operation on the entered character strings is performed, which is less intuitive and more difficult than the search of the embodiment.

The image search of the embodiment shown in FIGS. 2A to 3B is implemented by, as discussed below, in the search server 3, storing image data including position information as additional information to manage files of image data, which are content pieces to be searched, and associating the position information with map information (map database). In this point of view, the image search of the embodiment is a service or technique capable of effectively using image data having position information, thus providing a novel search system.

A technical structure for implementing the image search of the embodiment will be described.

Figure 4:
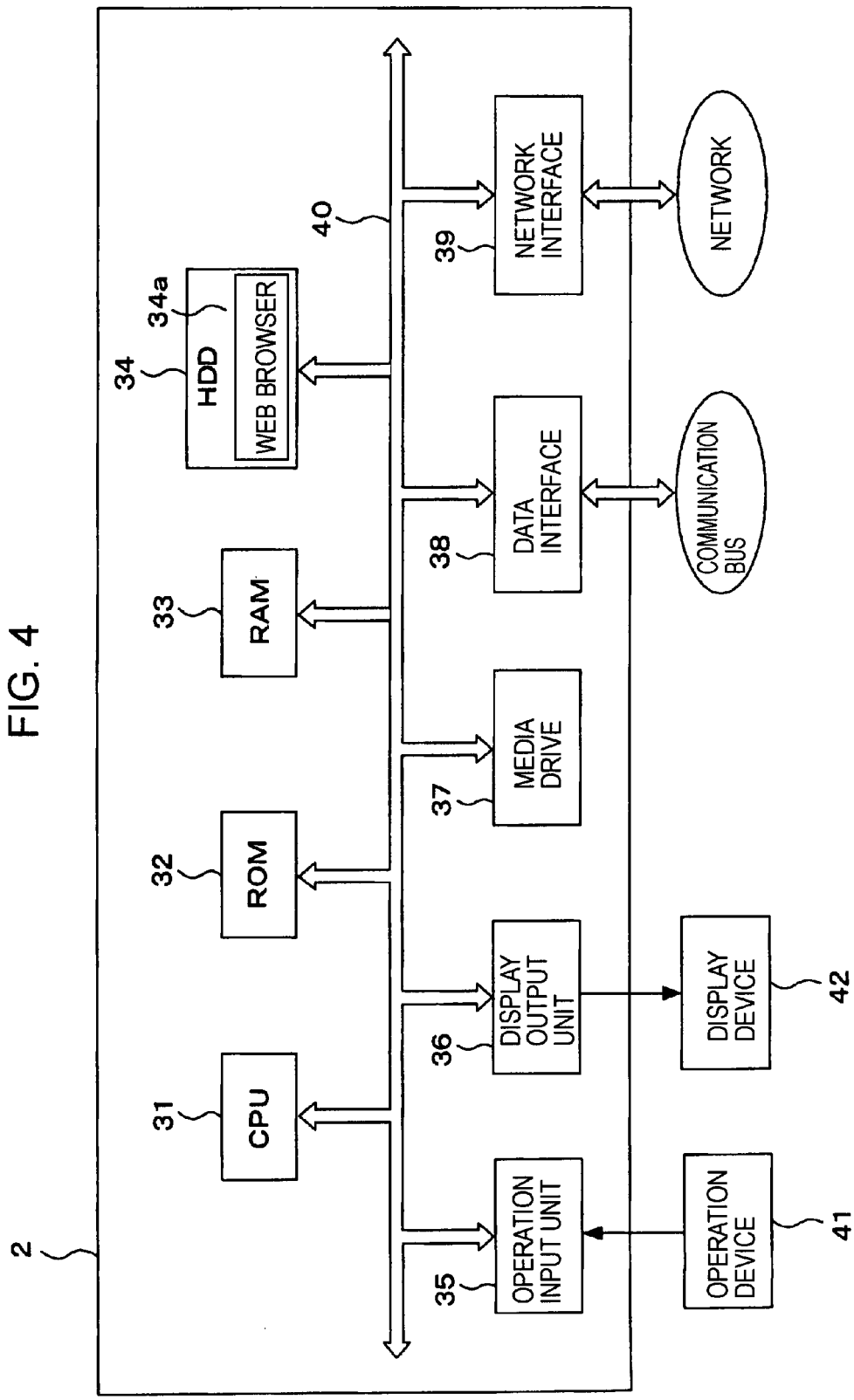
FIG. 4 is a diagram showing an example structure of a PC according to the embodiment.

FIG. 4 shows an example structure of a personal computer (PC) 2 used by a user to use a search service.

The PC 2 shown in FIG. 4 includes a central processing unit (CPU) 31, a read-only memory (ROM) 32, a random access memory (RAM) 33, a hard disk drive (HDD) 34, an operation input unit 35, a display output unit 36, a media drive 37, a data interface 38, and a network interface 39, which are connected with one another via an internal bus 40.

The CPU 31 loads programs, such as a program stored in the ROM 32 and an application program stored in the HDD 34, into the RAM 13 for execution. The RAM 33 also stores data and the like necessary for the CPU 31 to perform various types of processing, if necessary. The ROM 32 is generally unwritable, but may be a memory including a non-volatile writable memory device, such as a flash memory.

The HDD 34 serves as an auxiliary storage device in the PC 2, and stores the various programs executed by the CPU 31 by installing the programs therein. The HDD 34 also stores various application files and the like. The data stored in the HDD 34 is managed by a file system or the like. The CPU 31 can use the file system to write or read data to or from the HDD 34.

In FIG. 4, a Web browser 34a is illustrated among the programs installed in the HDD 34. The Web browser 34a is a software application for displaying a Web site uploaded and publicly accessible via the Internet or a locally stored document written in a markup language such as HTML and allowing the user to browse and use the Web site or the document. As can be understood from the foregoing description, in the embodiment, the Web browser 34a is used to access the search server 3 via a network (the Internet) for an image search.

Upon receiving a signal corresponding to an operation output from an operation device 41, the operation input unit 35 converts the received signal into an instruction that can be processed by the CPU 31, and outputs the instruction to the CPU 31. The CPU 31 executes processing in accordance with the instruction. The operation device 41 is a collection of various operation input devices for allowing a user to operate a computer, such as a mouse and a keyboard.

The display output unit 36 executes processing for displaying an image using a display device 42, for example, according to the control of the CPU 31.

The media drive 37 allows data read/write according to designated media such as, in the current state of the art, CD-ROMs, DVDs, and removable semiconductor memory elements compatible with predetermined standards. The media drive 37 is also controlled by the CPU 31.

The data interface 38 is configured by implementing hardware and software for communicating with an external device using a predetermined data communication method to perform communication between the PC 2 and the external device. In this case, for example, the data interface 38 has a configuration capable of communicating with the data interface 24 of the image capturing apparatus 1.

The network interface 39 is configured to realize an interface function for performing communication via a network such as the Internet or a local area network (LAN), and is compliant with a standard such as, in the current state of the art, Ethernet™ or a wireless LAN standard, e.g., IEEE 802.11a/b/g. If the network interface 39 is connected to the Internet using a telephone line, the network interface 39 may include a modem.

Figure 5:
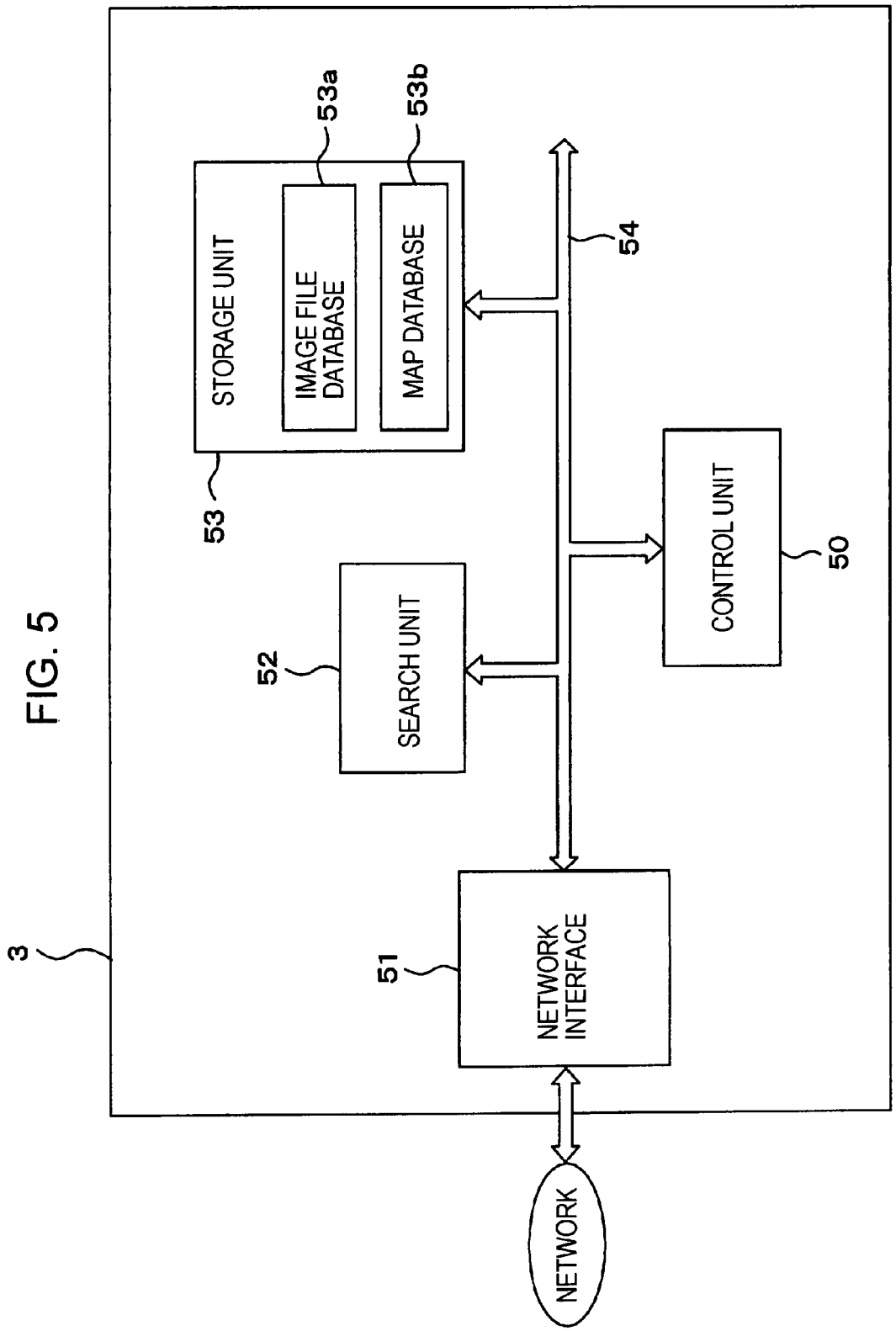
FIG. 5 is a diagram showing an example structure of a search server according to the embodiment.

FIG. 5 shows an example structure of the search server 3.

The search server 3 shown in FIG. 5 includes a control unit 50, a network interface 51, a search unit 52, and a storage unit 53, which are connected with one another via an internal bus 54.

The control unit 50 includes, for example, a CPU, a RAM, and a ROM, and executes a program stored in the internal ROM or the storage unit 53 to perform the control operation of the search server 3.

The network interface 51 is configured to realize an interface function for performing communication via a network such as the Internet or a LAN. The search server 3 is connected using the network interface 51 via the Internet to a terminal to which the search server 3 provides a service.

The search unit 52 is a section operable to perform a search against an image file database 53a and a map database 53b in the storage unit 53 using the entered search condition.

The function of the search unit 52 is implemented by, for example, actually, executing a program in accordance with to the function of the search unit 52 by the CPU in the control unit 50 and using the hardware resources forming the search server 3, such as a memory and a signal processing circuit.

The storage unit 53 actually includes, for example, an HDD, and stores various types of information and data necessary for the operation of the search server 3. In FIG. 5, the image file database 53a and the map database 53b are illustrated as the stored information.

The image file database 53a is a database of image files serving content pieces to be searched.

Figure 6:
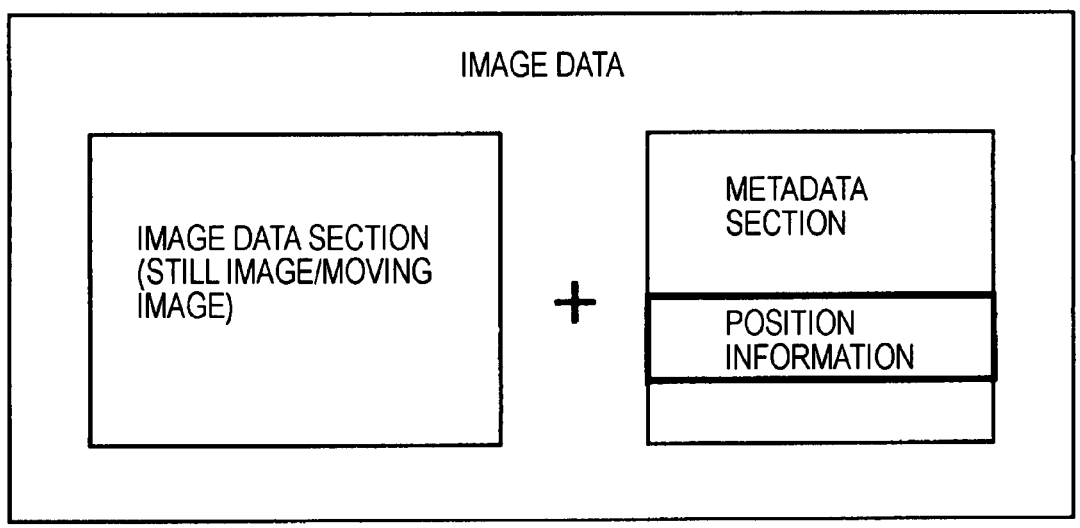
FIG. 6 is a diagram showing an example structure of an image file according to the embodiment.

FIG. 6 shows an example structure of an image file stored and managed by the storage unit 53 as the image file database 53a.

The image data file shown in FIG. 6 is formed of an image data section including an image data entity as a still image (or a moving image), and a metadata section including predetermined information items related to the contents of the image data section. A region for storing position information is provided at a predetermined position of the metadata section. The position information stored in the region is obtained by a GPS module, as described below, and may indicate a position at which the image data was captured. The information other than position information, which is stored in the metadata section, includes the image capture date and time, the data (file) size, the resolution of the image data section, the data rate, the encoding method, and setting values of various parameters such as the exposure and white balance set in the image capturing apparatus 1 during the image capturing process.

The map database 53b in the storage unit 53 shown in FIG. 5 is a database of pieces of map information. The map information stored in the map database 53b has a basic structure in which, first, position information represented by latitude and longitude is associated with a map image. In addition, for example, the names of places, addresses, and other additional information are associated with the position information.

Although not shown, the storage unit 53 can further store programs necessary for the operation of the search server 3. For example, in actual use, a program for an operating system (OS) and application programs running on the OS are stored. The application programs may include programs corresponding to the functions of the search unit 52 and the like.

A processing procedure performed by the PC 2 and the search server 3 for performing an image search according to the example described with reference to FIGS. 2A and 2B will be described with reference to FIG. 7. The procedure shown in FIG. 7 is started in a state where the Web browser 34a activated on the PC 2 accesses the Web search server 3 via the Internet to thereby display a search screen having an entry box for entering a character string, which is the top page of the search screen.

Figure 7:
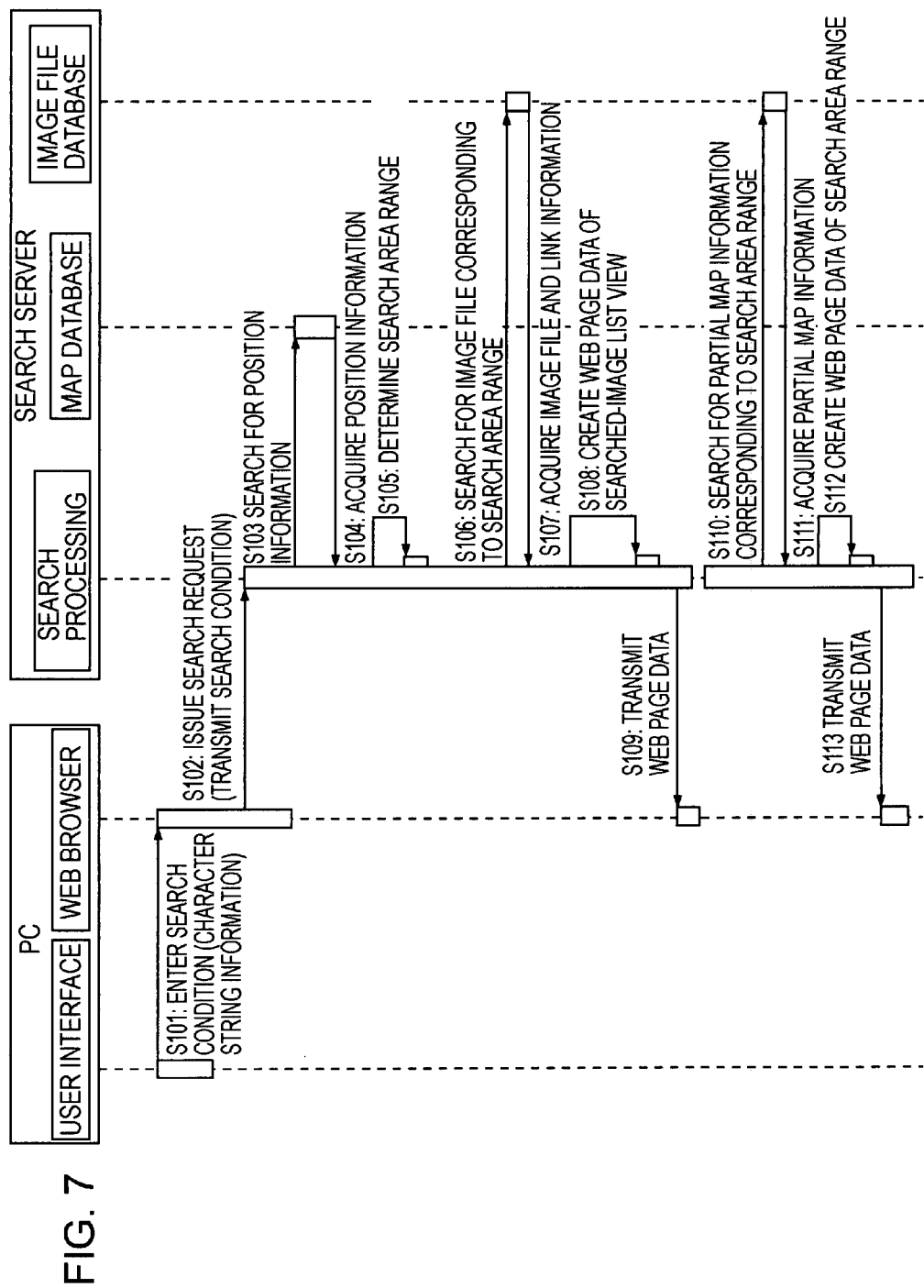
FIG. 7 is a diagram showing a processing procedure performed between the PC and the search server in accordance with an operation on the search screen views shown in FIGS. 2A and 2B.

In FIG. 7, a user interface and a Web browser are illustrated in the PC 2, and search processing, a map database, and an image file database are illustrated in the search server 3. The user interface in the PC 2 corresponds to the operation input unit 35. The Web browser of the PC 2 is stored in the HDD 34, and corresponds to the Web browser 34a that has already been activated and that is executed by the CPU 31. The search processing, the map database, and the image file database in the search server 3 correspond to the search processing unit 52, the map database 53b, and the image file database 53a shown in FIG. 5, respectively.

As described above, in order to perform an image search, first, the user performs an operation for entering a character string as a search condition in the entry box on the top page of the search screen displayed using the Web browser of the PC 2. In accordance with the operation, in step S101 shown in FIG. 7, the PC 2 enters character string information of a search condition from the user interface to the Web application. As a result, for example, the entered character string is displayed in the entry box of the search screen displayed using the Web browser. If an operation for issuing a search request is performed after a search character string has been entered, in step S102, the Web browser 34a transmits a search request together with the character string information entered as a search condition to the search server 3.

The search request is passed to the search unit 52 in the search server 3. In response to the request, the search unit 52 performs the processing of step S103. In step S103, the search unit 52 accesses the map database 53b, and searches for the position information corresponding to the character string information as the search condition received together with the search request.

As described above, the map database 53b has a basic structure in which position information is associated with a map image and character string information of various names to be shown on the map, such as place names, addresses, and facility names, is also associated with the position information. That is, the map information has a structure of information having a correspondence between the character string information indicating the place names and the like and the position information.

In step S103, map-related character information corresponding to the character string information of the search condition is specified from the map database 53b. Then, the position information of the map image associated with the retrieved map-related character information is found from the map database 53b. The found position information is position information for a point corresponding to a given place or spot. In step S104, the search unit 52 obtains the position information found in step S103. The obtained position information is the reference position rp in the search area range view.

In step S105, the search unit 52 determines a search area range. The search area range corresponds to, as shown in FIG. 2B, the search range designation frame MR provided at the position defined by the reference position rp on the map image in the search area range view.

The search area range can be determined in the following way: First, the map database 53b is configured so that the character information to be managed in association with the map image can be classified by name for management. The information can be classified into criteria such as residential addresses (the residential addresses can further be classified into prefecture, municipality, county, etc.), facility names, mountains, rivers, and famous historical places.

Then, it is determined which type the character string information of the search condition belongs to as the character information managed by the map database 53*b*, and a search area range is determined according to a predetermined rule on the basis of the determination result.

For example, "Mt. Fuji" is classified as a mountain. In the case of a character string in such classification, for example, even if a square search area range with sides measuring several kilometers is determined, for example, only an area around the top of Mt. Fuji is designated. It is therefore difficult to obtain an image file effective as a search result to be obtained later. In such classification, a search area range with sides measuring about several kilometers to several tens of kilometers is preferably used. Conversely, in the case of a search for facilities, stores, and the like, e.g., "ABC Ward Office" and "XYZ Department Store", it is not desirable to specify an area with sides measuring several kilometers, but is preferable to designate an area with sides measuring several tens of meters to several hundreds of meters.

For example, a rule for determining a search area range according to the classification of character information may be designated in consideration of the above-described search area characteristics, and the search unit 52 may determine a search area range using an algorithm complying with the rule.

The information entity of the search area range is based on position information. As merely an example, in a case where a search area range is rectangular in shape corresponding to the search range designation frame MR shown in FIG. 2B, pieces of position information on the map image corresponding to the four vertical angles of the rectangle are obtained. These pieces of position information can be used to specify pieces of position information included in the rectangular search area range. Further, for example, information concerning the length of a diagonal that is defined by the reference position rp and the size of the search range designation frame MR may be obtained as a search area range. By performing a predetermined computation using the reference position rp and the information of the length of the diagonal, position information defining the search range designation frame MR can be determined. Accordingly, even if the search range designation frame MR is round, elliptic or the like in shape, position information can be specified by performing a predetermined computation using, for example, the reference position rp and the radius.

The search area range determined in step S105 is therefore based on the position information.

When a search area range is determined in the manner described above, in step S106, the search unit 52 searches the image file database 53*a* for an image file using the position information corresponding to the determined search area range as a search condition.

As described above with reference to FIG. 6, each of the image files has position information added thereto. In step S106, an image file with position information matching the position information corresponding to the search area range is found. Then, in step S107, the data of the image file meeting the search condition and the link information indicating the location of the image file using the description of URL or the like are acquired from the image file database 53*a*.

According to the foregoing description, in step S101, character string information corresponding to the name of a place or the like is entered as a search condition. The character string information is converted into position information in steps S103 and S104, and the position information is actually used as a search condition to perform a search against the image file database 53*a*. That is, the user interface performs a search using character information, whereas in effect, the search is performed using position information. This can mean that the search condition entered using character string information by the user interface is provisional and that the position information used by the search server 3 to perform a search against the image file database 53*a* is designated as the actual search condition.

Then, in step S108, a process for creating data of a Web page as the search image list view shown in FIG. 2A is performed. In order to create the Web page, the data of the image file acquired in step S107 is used to produce a thumbnail image TN to be arranged in the search image list view. The link information of the image file acquired in step S107 is described in a document such as an HTML document so that, for example, the thumbnail image contains a link.

Then, in step S109, the search unit 52 returns as a search result the Web page data of the created search image list view to the PC 2 that has issued the search request. The PC 2 interprets the received Web page data using the Web browser 34*a* for reproduction. The search image list view is therefore displayed on the screen of the Web browser 34*a* in the manner shown in FIG. 2A.

When the search unit 52 of the search server 3 transmits the Web page data of the search image list view in step S109, then in steps S110 and S111, the search unit 52 searches the map database 53*b* for partial map information corresponding to the search area range, and acquires the partial map information.

As described above, the search area range determined in step S105 is formed of pieces of position information. In step S110, as shown in FIG. 2B, partial map information corresponding to an area including a range defined by the pieces of position information representing the search range at a certain proportion is found. The found and obtained partial map information includes at least information of a map image corresponding to the found area.

Then, in step S112, the search unit 52 creates a Web page of the search area range view shown in FIG. 2B using the obtained partial map information. The Web page of the search area range view may be created as content data using a document such as an HTML document. In particular, however, a Web page of a search area range view is produced so that the user can resize the search range designation frame MR displayed on the map image and a search request can be issued in which a new search condition is designated in accordance with the resizing of the search range designation frame MR. With regard to such a user interface function, for example, it is effective to create a Web page of a search area range view as a program called Java applet. As is well known in the art, Java applet is a program created using a programming language called Java and running on a Web browser having Java software installed therein.

In step S113, the created Web page data of the search area range view is transmitted to the PC 2. The PC 2 receives the transmitted Web page data of the search area range view, and passes the received data to the Web browser 34*a*. The Web browser 34*a* performs processing on the Web page data to thereby display, for example, the search area range view shown in FIG. 2B.

Figure 8:
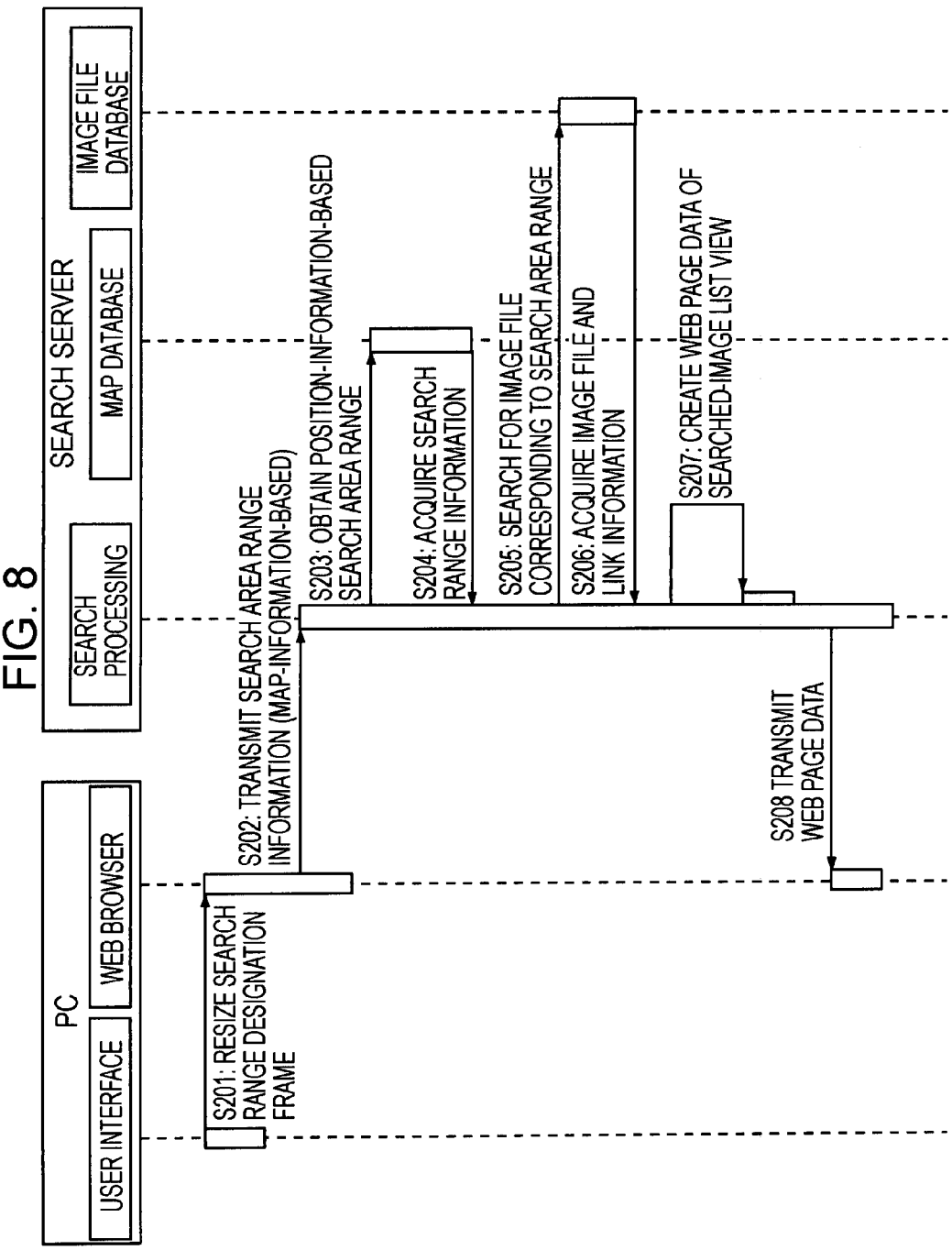
FIG. 8 is a diagram showing a processing procedure performed between the PC and the search server in accordance with an operation on the search screen views shown in FIGS. 3A and 3B.

A procedure for changing the search results (the image files listed) displayed in the search image list view in accordance with the resizing of the search range designation frame MR on the search area range view displayed using the Web browser in the manner shown in FIG. 3A will be described with reference to FIG. 8.

First, in accordance with an operation for resizing the search range designation frame MR, in step S201, an instruction corresponding to the operation is output from the user interface to the Web browser. Upon receiving the instruction, as described with respect to the transition from FIG. 2B to FIG. 3A by way of example, the Web browser performs image processing for resizing the search range designation frame MR on the currently displayed search area range view.

Then, in step S202, the Web browser designates a search area range corresponding to the search range designation frame MR resized in step 201, and transmits information of the search area range to the search server 3. The information entity of the search area range may be represented on the basis of, for example, the position information associated with the map image. For example, the information entity is represented using coordinates on an image as viewed as a map image. That is, the Web browser transmits the information of the map-information-based search area range.

If the search area range designated and transmitted in step S201 is based on position information, the position information is added to the Web page of the search area range view created in step S112 shown in FIG. 7 according to the coordinates of the map image. Thus, the data size of the Web page increases, resulting in a drawback of increasing the network transmission time and the like. Further, if the Web browser is to execute such Web page data of the search area range view, the processing is heavy, resulting in a drawback of reducing the operation speed and the like.

Upon receiving the information of the search area range transmitted in step S202, the search server 3 passes the received information to the search unit 52. Then, in steps S203 and S204, the search unit 52 matches the passed information of the search area range, which is represented using the coordinates of the map image, with the map information of the map database 53b to obtain position information into which the coordinates are converted. That is, the search area range is converted from that represented using the coordinates of the map image to that represented using the position information.

Then, in steps S205 and S206, the search unit 52 searches the map database 53b for image files using the data of the position-information-based search area range obtained in step S205 as a search condition, and acquires the found image files and link information of the image files. The processing of steps S205 and S206 is substantially similar to that of steps S106 and S107 shown in FIG. 7.

Then, in steps S207 and S208, the search unit 52 creates Web page data of the search image list view using the image files acquired in step S205 and the link information of the image files, and transmits the Web page data to the PC 2. The processing of steps S207 and S208 may be performed in a similar manner to the processing of steps S108 and S109 shown in FIG. 7.

The PC 2 receives the Web page data of the search image list view transmitted in step S208, and passes the Web page data to the Web browser. The Web browser processes the Web page data so that, for example, the search image list view displayed in the manner shown in FIG. 2A can be changed in the manner shown in FIG. 3B in accordance with the resizing of the search range designation frame MR.

As can be understood from the foregoing description, in order to implement the search service of the embodiment, the search server 3 stores therein image files with position information. An example model for the search server 3 to collect image files with position information will be described with reference to FIG. 9.

Figure 9:
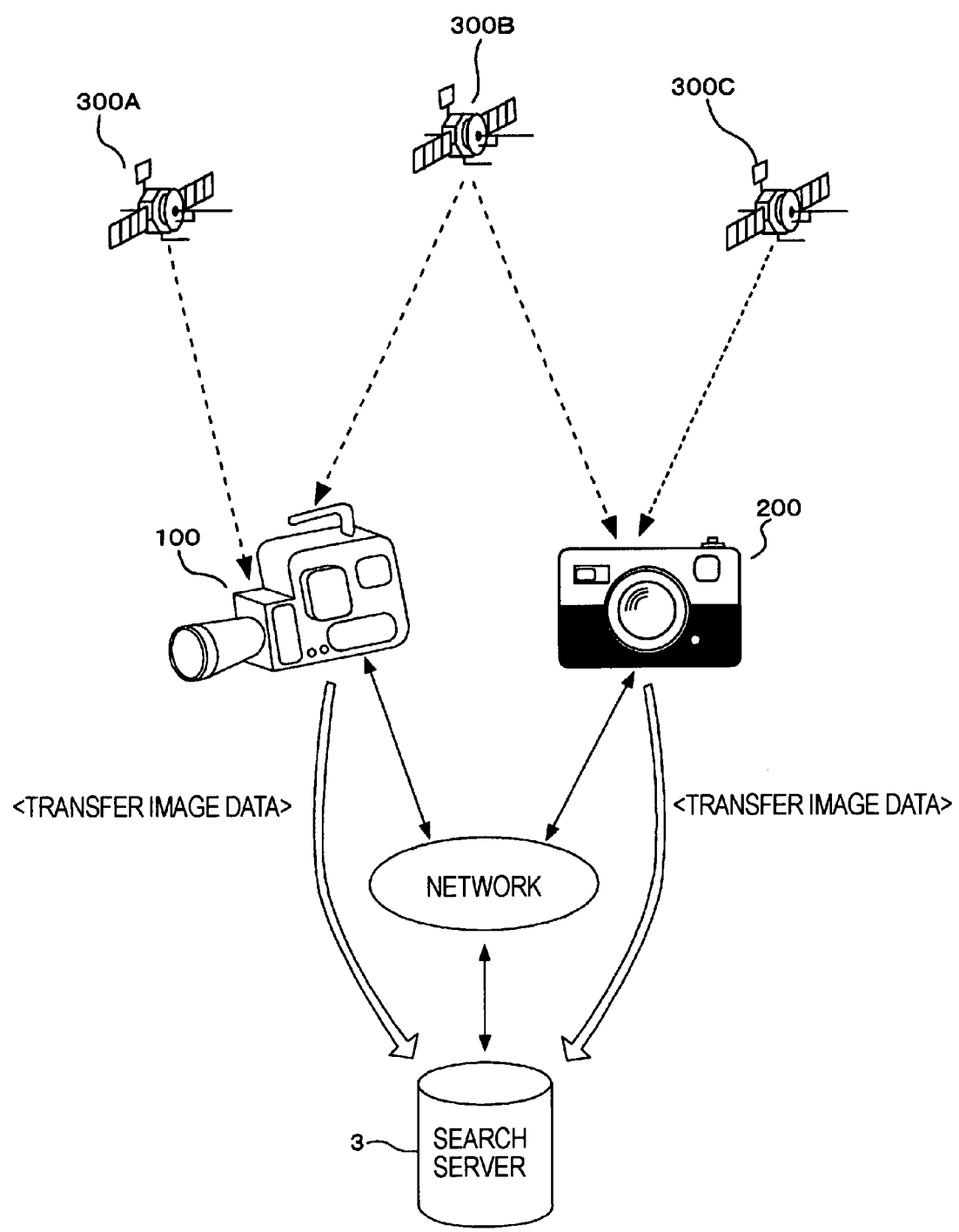
FIG. 9 is a schematic diagram showing an example of the model for the search server of the embodiment to collect image files.

FIG. 9 shows a video camera 100 and a digital still camera 200 as image capturing apparatuses used by general public users. Each of the video camera 100 and the digital still camera 200 includes a built-in GPS module. The GPS module is a component device capable of receiving radio waves from GPS satellites and performing positioning computation to obtain positioning information.

With the use of the built-in GPS modules, the video camera 100 and the digital still camera 200 can receive radio waves from a plurality of GPS satellites (300A, 300B, and 300C), and can perform positioning computation using a predetermined positioning method to obtain at least current position information as positioning information.

In the video camera 100 or the digital still camera 200, when the user performs an image capturing and recording, image data obtained by the capturing operation is stored in a storage medium included therein or a removable storage medium placed therein, for example, on a file-by-file basis. Each of the files (image file) of the stored image data is added with, for example, metadata (additional information) having predetermined information items related to the contents of the image data, the capturing conditions, and so forth. In this example, the metadata includes the position information obtained by the GPS module.

That is, those image capturing apparatuses (the video camera 100 and the digital still camera 200) are configured to obtain an image file having the structure shown in FIG. 6.

Then, the user transmits and uploads an image file captured and recorded by the image capturing apparatus to the search server 3 via a network. As described above, the search server 3 organizes the transmitted image file into the image file database 53a for storage.

There may be conceived other models for the search server 3 to collect image files with position information. For example, a Web page publicly available on the Internet has a format in which the meta-information, as well as the file name, of an image file pasted or linked in the Web page, can be reflected in the source such as the HTML document. In addition, for example, a search robot or the like for automating deep searches on the Internet is used to obtain the location and position information of the image file to configure the image file database 53a. The entity of the file is not necessarily located in the image file database 53a. However, the search operation of the search server 3 described above can be easily implemented using, for example, technologies of many existing network search systems.

An example structure of the image capturing apparatus, that is, the video camcorder 100 or the digital still camera 200 shown in FIG. 9, will additionally be described with reference to FIG. 10. In FIG. 10, the structure of an image capturing apparatus 1, namely, a structure for recording a captured image, is illustrated. In FIG. 10, a solid arrow depicts the flow of information serving, as user data to be written and stored in a recording medium (storage medium) in a storage unit, such as a video signal, an audio signal, or meta-information. A hollow arrow depicts the flow of information for various control operations.

The image capturing apparatus 1 shown in FIG. 10 includes an image pickup unit 11. The image pickup unit 11 includes an optical system (image pickup optical system), an image pickup device, and an image signal processing system for performing signal processing to be performed before compression coding. The optical system includes a lens unit formed of image pickup lenses, and an aperture stop. The lens unit includes a focus lens for adjusting the focus, and a zoom lens for adjusting the zoom (angle-of-view). The image pickup unit 11 is provided with a focus lens driving mechanism including a gear and a motor for moving the focus lens along the optical axis to adjustment the focus. The image pickup unit 11 is also provided with a zoom lens driving mechanism including a gear and a motor for moving the zoom lens along the optical axis to adjust the zoom.

In the image pickup unit 11, image pickup light obtained by the optical system is focused onto a photoelectric conversion element unit provided in the image pickup device, and is converted into an electrical signal. Examples of photoelectric conversion elements include charge coupled device (CCD) elements and complementary metal-oxide semiconductor (CMOS) elements.

In the image pickup unit 11, the electrical signal output from the image pickup device is subjected to processing such as correlated double sampling (CDS) and automatic gain control (AGC), and is then converted into a digital signal, which is further subjected to predetermined image signal processing using digital signal processing. As the image signal processing, predetermined digital signal processing is performed, for example, a digital video signal corresponding to the captured image is obtained from the digital signal.

In the image pickup unit 11, predetermined signal processing is further performed, such as generation of predetermined control parameters used by a camera control unit 18 to perform camera control operations. The camera control operations performed by the camera control unit 18 include auto focus (AF) control, exposure control, white balance processing, and camera-shake correction. These camera control operations may be performed using known techniques.

The image capturing apparatus 1 of the embodiment further includes a position detection unit 21.

The position detection unit 21 is formed of devices including a global positioning system (GPS) module, and is configured to detect, for example, a current position. The detected position information is represented by latitude, longitude, and so forth. In the embodiment, the position information detected by the position detection unit 21 is input to the camera control unit 18.

In the embodiment, the obtained position information is used as additional information to be added to a file of captured image data to be stored in a storage unit 17, that is, the position information to be stored in the metadata section of the image data shown in FIG. 6. The position information may be used for other applications. The position detection unit 21 may have any other structure without including a GPS module, which is capable of obtaining information of a current position.

The digital video signal that is finally obtained by the image pickup unit 11 is input to a video compression unit 12. The video compression unit 12 performs compression coding on the input video signal according to a predetermined method. In the current state of the art, for moving images, a compression coding method for moving picture information, such as MPEG (Moving Picture Experts Group) related technologies, may be used. For still images, a still image compression coding method such as JPEG (Joint Photographic Experts Group) may be used.

As a result of the compression coding by the video compression unit 12, image data of the moving image or still image is obtained, and is then output to a multiplexer 15.

The image capturing apparatus 11 further includes a sound pickup unit 13. The sound pickup unit 13 includes a predetermined number of microphones for picking up sound to produce an audio signal, and an audio signal processing system for performing predetermined signal processing to be performed before compression coding on the audio signal obtained by the microphones. In the sound pickup unit 13, the audio signal is converted from analog to digital at a predetermined signal processing stage.

The digital audio signal output from the sound pickup unit 13 is output to an audio compression unit 14.

The audio compression unit 14 performs audio compression coding corresponding to the image compression coding performed by the video compression unit 12, and outputs the result to the multiplexer 15. In the case of moving-image recording, the video compression unit 12 and the audio compression processing unit 14 perform compression coding so that the so-called. "lip sync" can be maintained, and output the compression-coded video signal (or compressed video data) and the compression-coded audio signal (or compressed audio data), respectively.

The camera control unit 18 is a section representing a collection of predetermined control functions for a camera unit in the image pickup unit 11, such as the above-described AF control and zoom control functions. The information obtained by the camera control unit 18, such as certain control results, is acquired by a metadata (management information) control unit 20, and is used to generate metadata.

A video control unit 23 performs various control operations so that the signal processing operation of the video compression unit 12 can correctly be performed. For example, the video control unit 23 acquires data from the video compression unit 12, performs various types of detection, such as motion detection, and computation for compression processing, and controls the signal processing operation of the video compression unit 12 according to the detection result and the computation result. The information obtained by the video control unit 23, such as a detection result or control result for a predetermined item, is acquired by the metadata control unit 20, and can be used to generate management information.

An audio control unit 19 controls the audio signal processing operation. That is, the audio control unit 19 is configured to control the signal processing operation of the audio compression processing unit 14 on the basis of predetermined information output according to, for example, a signal processing result of the sound pickup unit 13. The information obtained by the audio control unit 19, such as a certain control result, is also acquired by the metadata control unit 20, and can be used to generate metadata.

A user interface control unit 22 acquires operation information that is obtained by operating various operating elements provided for the image capturing apparatus 1, and processes the operation information so that the image capturing apparatus 1 can perform a correct operation in accordance with the operation. The user interface control unit 22 transmits operation information obtained by a predetermined operation to appropriate components in the illustrated functional units.

The metadata control unit 20 generates information (metadata) serving as the metadata section to be added to the image data, shown in FIG. 6 by way of example. As described above, in order to generates management information, the metadata control unit 20 uses the information output from the camera control unit 18, the audio control unit 19, the video compression unit 12, and the like, such as predetermined control information and detection results, and collects and generates various information items of metadata including the position information detected by the position detection unit 21 and the image capture date and time. Then, the metadata control unit 20 stores information items in a predetermined data structure to obtain information units as metadata.

The compression-coded image data as the moving image or still image (in the case of moving-image recording, also the compressed audio data) and the information of metadata are input to the multiplexer 15. The multiplexer 15 performs predetermined processing such as multiplexing and combination on the compression-coded image data of the moving image or still image and the metadata to generate image data having the data structure shown in FIG. 6, which is composed of an image data section and a metadata section. The generated image data is subjected to processing such as recording encoding in the recording format of the storage unit 17 to generate recording data, and the recording data is transferred to and accumulated in a buffer unit 16.

The buffer unit 16 transfers a predetermined amount of accumulated recording data to the storage unit 17 for writing. By sequentially recording data in the manner described above, for example, the image data shown in FIG. 6 is recorded.

Specifically, the storage unit 17 includes a predetermined recording medium (storage medium), and a drive capable of data recording (and reproduction) compatible with the recording medium. The recording medium may be a removable medium or a medium fixedly mounted together with the drive, such as a hard disk drive (HDD).

If the storage unit 17 is a digital versatile disc (DVD), the recording format of the storage unit 17 employs the so-called DVD format, such as DVD-Video or DVD-VR (Video Recording).

A data interface 24 is configured by implementing hardware and software for communicating with an external device using a predetermined data communication method to perform communication between the image capturing apparatus 1 and the external device. The data communication method supported by the communication unit 16 is not particularly limited regardless of wired or wireless communication, and the number of supported data communication methods is not limited. Currently available examples of the data communication methods may include data bus standards for wired communication, such as USB (Universal Serial Bus), IEEE1394, and SCSI (Small Computer System Interface), and inter-device near field communication standards for wireless communication, such as Bluetooth™. In the embodiment, the data communication using the data interface 24 allows the image data files stored in the storage unit 17 to be transmitted to the outside via a communication bus.

The structure shown in FIG. 10 is represented by blocks indicating the image (and sound) recording functions of an image capturing apparatus, and is different from the actual hardware structure. In effect, the image capturing apparatus includes a section operable to capture an image using an image pickup device and the like, a section operable to pick up sound using a microphone and the like, a processor operable to convert video and audio signals obtained by those sections into digital signals and to perform predetermined processing such as digital signal processing, coding, and multiplexing, a drive corresponding to a predetermined recording medium, and a microcomputer or the like including a CPU, a ROM, and a RAM and operable to perform various predetermined control operations.

The present invention is not limited to the embodiment described above, and a variety of modifications may be made.

In the embodiment, for example, for ease of description, photograph images captured and recorded by an image capturing apparatus, that is, data files of captured and recorded still images, are used as the information to be searched. However, as can be anticipated from the video camera 100 shown in FIG. 9, data files of captured and recorded moving images may be used. Also in the case of moving image files, thumbnail images using still images or moving images can be produced from the data contents, and a Web page of a search image list view can be created.

Further, image files other than that captured and recorded, such as image files created by rendering, may be used as the information to be searched. In this case, instead of adding position information at the same time as the capturing and recording operation, an editing operation for adding position information during or after the creation of the image files may be performed. Further, files other than image files, such as document files, may be used. That is, the information to be searched according to an embodiment of the present invention may be information having information contents significant and useful for a user who uses a search service, such as images and documents. When position information is added to such information to be searched other than captured images, preferably, the position information represents a location such as a place where the information was created or a place relating to the information.

While the embodiment has been described in the context of a system configuration in which a PC accesses the search server 3 via a network to perform a search, the present invention is not limited thereto. For example, elements corresponding to the image file database 53a and the map database 53b can be incorporated into a computer system such as a PC, thereby achieving a locally completed image search system within the computer system.

While in the embodiment of the present invention, a provisional search condition entered by a user who performs a search is represented by character string information, it may be represented by a predetermined type or form of information other than character strings, except for position information.

It should be understood by those skilled in the art that various modifications, combinations, sub-combinations and alterations may occur depending on design requirements and other factors insofar as they are within the scope of the appended claims or the equivalents thereof.

What is claimed is:
1. A search apparatus comprising:
a processor for:
inputting character string information as a provisional search condition;
holding character string/position correspondence information including a correspondence between character string information indicating a predetermined name of a location and position information;
searching position information by searching the character string/position correspondence information to obtain, as position information from the searching, the position information corresponding to the character string information indicating the predetermined name of a location which corresponds to the character string information input as the provisional search condition, wherein the position information is a reference position in a search area range view;
storing search object information of predetermined form having at least position information added thereto as additional information;
performing a search for the position information added to the search object information stored using the position information from the searching as an actual search condition, and outputting, as a search result satisfying the provisional search condition, search object information to which position information found by the search is added; and controlling display of a search image list view as the search result searched and the search area range view including the reference position and a search range designation frame of a predetermined shape positioned with reference to the reference position in a same window.

2. The search apparatus according to claim 1, wherein the search result searched is a list of images.

3. The search apparatus according to claim 1, wherein the processor is for controlling display of the search range designation frame on map information corresponding to the position information from the searching.

4. The search apparatus according to claim 3, wherein the search range designation frame has a rectangular shape.

5. The search apparatus according to claim 3, wherein the search range designation frame corresponds to the search result searched.

6. The search apparatus according to claim 1, wherein the processing unit determines a search area range from the searching in accordance with a size of the search range designation frame.

7. The search apparatus according to claim 6, wherein the search area range corresponds to a type of the character string information.

8. The search apparatus of claim 1, wherein the search range designation frame corresponds to a configuration of the search area range view.

9. The search apparatus according to claim 1, wherein the search range designation frame defines a range of positions corresponding to the search result searched displayed as the search image list view.

10. The search apparatus according to claim 1, wherein the character string/position correspondence information includes a correspondence between character string information indicating a predetermined name of a three-dimensional object and the position information.

11. A search method comprising:
inputting character string information;
searching position information by searching character string/position correspondence information including a correspondence between character string information indicating a predetermined name of a location and position information, to obtain, as position information from the searching, the position information corresponding to the character string information indicating the predetermined name of a location which corresponds to the character string information input as the provisional search condition, wherein the position information is a reference position in a search area range view; and
performing a search for another position information added as additional information to search object information of predetermined form using the position information from the searching as an actual search condition, and outputting, as a search result satisfying the provisional search condition, search object information to which position information found by the search is added; and
controlling display of a search image list view as the search result searched and a search area range view including the reference position and a search range designation frame of a predetermined shape positioned with reference to the reference position in a same window.

12. A program stored on a non-transitory storage medium executable by a computer for allowing a search apparatus to execute a process comprising:

inputting character string information as a provisional search condition;
searching position information by searching character string/position correspondence information including a correspondence between character string information indicating a predetermined name of a location and position information, to obtain, as position information from the searching, the position information corresponding to the character string information indicating the predetermined name of a location which corresponds to the character string information input as the provisional search condition, wherein the position information is a reference position in a search area range view;
performing a search for another position information added as additional information to search object information of predetermined form using the position information from the searching as an actual search condition, and outputting, as a search result satisfying the provisional search condition, search object information to which position information found by the search is added; and
controlling display of a search image list view as the search result searched and the search area range view including the reference position and a search range designation frame of a predetermined shape positioned with reference to the reference position in a same window.

13. A search apparatus comprising:
a provisional search condition inputting unit that inputs character string information as a provisional search condition;
a character string/position correspondence information holding unit that holds character string/position correspondence information including a correspondence between character string information indicating a predetermined name of a location and position information;
a position information searching unit that searches position information by searching the character string/position correspondence information to obtain, as position information from the searching by the position information searching unit, the position information corresponding to the character string information indicating the predetermined name of a location which corresponds to the character string information input as the provisional search condition, wherein the position information is a reference position in a search area range view;
a search object information storage unit that stores search object information of predetermined form having at least position information added thereto as additional information;
a searching unit that performs a search for the position information added to the search object information stored in the search object information storage unit using the position information from the searching by the position information searching unit as an actual search condition, and that outputs, as a search result satisfying the provisional search condition, search object information to which position information found by the search is added; and
a display control unit that controls a display unit to display a search image list view as the search result searched by the searching unit and the search area range view including the reference position and a search range designation frame of a predetermined shape positioned with reference to the reference in a same window.

* * * * *